(12) United States Patent
Ding et al.

(10) Patent No.: US 8,705,062 B2
(45) Date of Patent: Apr. 22, 2014

(54) QUOTAS IN DISTRIBUTED SCAN MANAGEMENT SYSTEMS

(75) Inventors: Yi Ding, Saratoga, CA (US); Jiang Hong, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 80 days.

(21) Appl. No.: 13/406,401

(22) Filed: Feb. 27, 2012

(65) Prior Publication Data

US 2013/0222861 A1  Aug. 29, 2013

(51) Int. Cl.
*H04N 1/04* (2006.01)

(52) U.S. Cl.
USPC ........... 358/1.13; 358/474; 358/498; 358/497

(58) Field of Classification Search
USPC .................. 358/1.13, 474, 498, 497, 505
See application file for complete search history.

(56) References Cited

U.S. PATENT DOCUMENTS

| | | |
|---|---|---|
| 2006/0290967 A1 | 12/2006 | Sumitomo et al. |
| 2009/0240697 A1 | 9/2009 | Fenelon |
| 2009/0290190 A1 | 11/2009 | Torii |
| 2011/0149352 A1 | 6/2011 | Ding |
| 2012/0194837 A1* | 8/2012 | Kamata .................. 358/1.13 |
| 2013/0155443 A1 | 6/2013 | Wu et al. |
| 2013/0215453 A1 | 8/2013 | Ding et al. |

OTHER PUBLICATIONS

Windows Dev Center Hardware entitled "Distributed Scan Device Web Service Protocolsummary" dated Dec. 1, 2011 (3 pgs).

* cited by examiner

*Primary Examiner* — Houshang Safaipour
(74) *Attorney, Agent, or Firm* — Hickman Palermo Truong Becker Bingham Wong LLP; Edward A. Becker

(57) ABSTRACT

A method and apparatus is provided for processing acquired document data, using distributed scan management protocols, according to a quota limiting amounts of data that may be stored at DSM system destinations. A scanning device includes a distributed scan management service that implements a distributed scan device protocol and a distributed scan processing protocol. The distributed scan management service is configured, responsive to a quota handler service (included at the scanning device) designating a verification success for scan data, to send the scan data and information for post scan processing instructions to a scan server. The quota handler service is configured to determine whether a size of the scan data exceeds a limit on an amount of data that may be sent to a particular destination, and, responsive to determining that the size of the scan data does not exceed the limit, designate a verification success for the scan data.

18 Claims, 4 Drawing Sheets

QUOTAS IN DISTRIBUTED SCAN MANAGEMENT SYSTEMS

CROSS-REFERENCE TO RELATED APPLICATIONS

This application is related to U.S. patent application Ser. No. 13/331,992, filed Dec. 20, 2011, entitled "CONTENT-BASED SECURITY PROCESSING USING DISTRIBUTED SCAN MANAGEMENT PROTOCOLS", the entire disclosure of which is hereby incorporated by reference as if fully set forth herein.

This application is related to U.S. patent application Ser. No. 13/398,704, filed Feb. 16, 2012, entitled "ADDITIONAL INPUT SOURCES FOR DATA ACQUISITION AT DISTRIBUTED SCAN MANAGEMENT SYSTEMS", the entire disclosure of which is hereby incorporated by reference as if fully set forth herein.

FIELD OF THE INVENTION

The present invention relates to processing acquired document data at a distributed scan management system based, at least in part, on quotas limiting amounts of acquired data that may be stored at particular DSM system destinations.

BACKGROUND

An enterprise scanning system implements protocols that allow for entities to easily route documents that enter the system via a scanning device according to rules determined by system administrators and/or users of scanning devices. An example enterprise scanning system is Distributed Scan Management (DSM) implemented by Microsoft and deployed in Windows 7/Windows 2008 Server R2.

An enterprise scanning system that is implemented using DSM (a "DSM system") allows a user to authenticate user data via a DSM scanning device and to select from one or more sets of post scan processing instructions that are made available to the user. A set of post scan processing instructions (PSP) contains instructions for processing acquired documents, including one or more destinations to which acquired document data should be sent. For example, a PSP may indicate that acquired document data should be emailed to one or more email addresses, copied to one or more specified file servers, uploaded to one or more specified websites, etc., all of which are examples of destinations. A PSP may also include, among other things, settings for scanning data such as color style, scan resolution, file format type, etc.

After a user is authenticated and has selected a PSP, the user may scan document data into the system at the DSM scanning device. The DSM system processes the scanned document data according to the selected PSP, including sending the scanned document data to destinations listed in the selected PSP.

A destination may have a limit on how much data the destination can accept. For example, a file server destination may be associated with a finite amount of memory in which to store scan data. Thus, a user may overtax a particular destination by sending too much data to the destination via a DSM system. For example, a user may send multiple documents to a particular destination file server, either accidentally or maliciously, which fills up the server memory and prevents other uses of the file server. Thus, it would be advantageous to control an amount of data that a user may store at destinations via a DSM system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

An approach is provided for processing acquired document data based, at least in part, on quotas limiting amounts of acquired data that may be stored at particular DSM system destinations. A scanning device through which the document data is acquired includes a scan service configured to scan a document and generate scan data based on the document scan. The scanning device also includes a distributed scan management service that implements a distributed scan device protocol and a distributed scan processing protocol. In embodiments, the distributed scan device protocol and the distributed scan processing protocol are implemented using Web services. The distributed scan management service is configured to receive information for post scan processing instructions, and, responsive to a quota handler service (also included at the scanning device) designating a verification success for the scan data, send the scan data and information for the post scan processing instructions to a scan server. The quota handler service is configured to determine whether a size of the scan data exceeds a limit on an amount of data that may be sent to a particular destination identified in the post scan processing instructions, and, responsive to determining that the size of the scan data does not exceed the limit, designate a verification success for the scan data.

In an embodiment, the quota handler service is further configured to determine the limit on the amount of data that may be sent to the particular destination identified in the post scan processing instructions based, at least in part, on a quota for the particular destination. In another embodiment, the quota handler service is further configured to determine the limit on the amount of data that may be sent to the particular destination identified in the post scan processing instructions based, at least in part, on a buffer value for the particular destination. In another embodiment, the quota handler service is further configured to determine the limit on the amount of data that may be sent to the particular destination based, at least in part, on a percentage of available storage at the particular destination.

In embodiments, the scanning device also includes a repository management service configured to update, in a repository, a quota for the particular destination based, at least in part, on the post scan processing instructions. In such embodiments, the quota handler service is further configured to retrieve the updated quota for the particular destination from the repository, and determine the limit on the amount of data that may be sent to the particular destination based, at least in part, on the updated quota.

In embodiments, the quota handler service is further configured to determine whether the size of the scan data exceeds a second limit on an amount of data that may be sent to a destination identified in the post scan processing instructions, and, responsive to determining that the size of the scan data exceeds the second limit, designate a verification failure for the scan data. In such embodiments, the destination may be a second destination, other than the particular destination, identified in the post scan processing instructions. Further, the destination may be the particular destination. Also in one or more such embodiments, the distributed scan management service is further configured to receive information identifying one or more updated destinations, wherein associated limits on the amount of data that may be sent to the updated destinations are not exceeded by the size of the scan data, and wherein the updated destinations are identified in the post scan processing instructions. The distributed scan management service is further configured to modify the post scan processing instructions to identify the updated destinations and to not identify the particular destination, and substitute the modified post scan processing instructions for the post scan processing instructions in the step of sending the scan data and information for the post scan processing instructions to the scan server.

DETAILED DESCRIPTION

Figure 1:
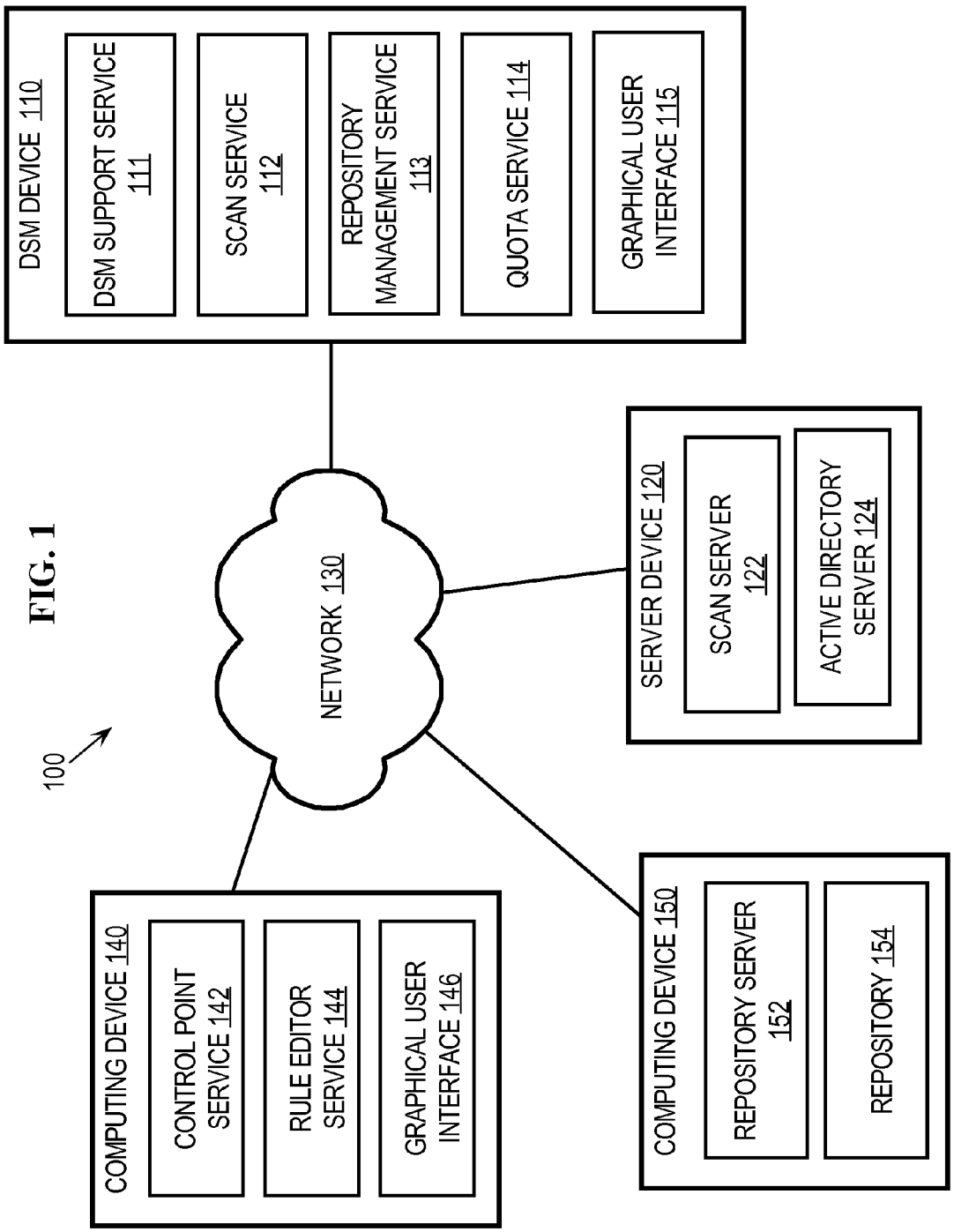
FIG. 1 is a block diagram that depicts an example network arrangement for implementing user quotas in a DSM system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

An approach is provided for processing acquired document data based, at least in part, on quotas limiting amounts of acquired data that may be stored at particular DSM system destinations. A scanning device through which the document data is acquired includes a scan service configured to scan a document and generate scan data based on the document scan. The scanning device also includes a distributed scan management service that implements a distributed scan device protocol and a distributed scan processing protocol. In embodiments, the distributed scan device protocol and the distributed scan processing protocol are implemented using Web services. The distributed scan management service is configured to receive information for post scan processing instructions, and, responsive to a quota handler service (also included at the scanning device) designating a verification success for the scan data, send the scan data and information for the post scan processing instructions to a scan server. The quota handler service is configured to determine whether a size of the scan data exceeds a limit on an amount of data that may be sent to a particular destination identified in the post scan processing instructions, and, responsive to determining that the size of the scan data does not exceed the limit, designate a verification success for the scan data.

In an embodiment, the quota handler service is further configured to determine the limit on the amount of data that may be sent to the particular destination identified in the post scan processing instructions based, at least in part, on a quota for the particular destination. In another embodiment, the quota handler service is further configured to determine the limit on the amount of data that may be sent to the particular destination identified in the post scan processing instructions based, at least in part, on a buffer value for the particular destination. In another embodiment, the quota handler service is further configured to determine the limit on the amount of data that may be sent to the particular destination based, at least in part, on a percentage of available storage at the particular destination.

In embodiments, the scanning device also includes a repository management service configured to update, in a repository, a quota for the particular destination based, at least in part, on the post scan processing instructions. In such embodiments, the quota handler service is further configured to retrieve the updated quota for the particular destination from the repository, and determine the limit on the amount of data that may be sent to the particular destination based, at least in part, on the updated quota.

In embodiments, the quota handler service is further configured to determine whether the size of the scan data exceeds a second limit on an amount of data that may be sent to a destination identified in the post scan processing instructions, and, responsive to determining that the size of the scan data exceeds the second limit, designate a verification failure for the scan data. In such embodiments, the destination may be a second destination, other than the particular destination, identified in the post scan processing instructions. Further, the destination may be the particular destination. Also in one or more such embodiments, the distributed scan management service is further configured to receive information identifying one or more updated destinations, wherein associated limits on the amount of data that may be sent to the updated destinations are not exceeded by the size of the scan data, and wherein the updated destinations are identified in the post scan processing instructions. The distributed scan management service is further configured to modify the post scan processing instructions to identify the updated destinations and to not identify the particular destination, and substitute the modified post scan processing instructions for the post scan processing instructions in the step of sending the scan data and information for the post scan processing instructions to the scan server.

Architecture for Implementing Quotas

FIG. 1 is a block diagram that depicts an example network arrangement 100 for implementing user quotas in a DSM system, according to embodiments. Network arrangement 100 includes a DSM device 110, a server device 120, and computing devices 140 and 150, communicatively coupled via a network 130. The DSM system represented in example network arrangement 100 includes the services on DSM device 110, the servers on server device 120, and control point service 142 on computing device 140, and may include other services and servers according to a particular implementation.

In example network arrangement 100, DSM device 110 is configured to scan document data and process the data according to a selected PSP, as described in further detail below. DSM device 110 may be implemented by any type of device that is capable of scanning document data, implementing a distributed scan device protocol and a distributed scan processing protocol, and communicating with one or more of server device 120, computing device 140, and computing device 150 via network 130. A description of a distributed scan device protocol may be found in "DISTRIBUTED SCAN DEVICE WEB SERVICE PROTOCOL SUMMARY" located at "en-us/library/windows/hardware/ ff540604%28v=VS.85%29.aspx" on the server "msdn.microsoft.com", the contents of which are incorporated by reference as if fully set forth herein. Further, a description of a distributed scan processing protocol may be found in "DISTRIBUTED SCAN PROCESSING WEB SERVICE PROTOCOL SUMMARY" located at "en-us/library/windows/hardware/ff540624%28v=VS.85%29.aspx" on the server "msdn.microsoft.com", the contents of which are also incorporated by reference as if fully set forth herein.

In example network arrangement 100, DSM device 110 is configured with a DSM support service 111, a scan service 112, a repository management service 113, a quota service 114, and a graphical user interface 115. DSM device 110 may be configured with other mechanisms, processes and functionality, depending upon a particular implementation. According to particular embodiments, DSM device 110 may be configured without one or more of the services associated therewith in example network arrangement 100. The approaches described herein for processing scanned document data are not limited to any particular type of DSM device or network configuration. For example, implementations of DSM device 110 may include a scanning device, a multi-function peripheral (MFP) that performs any combination of printing, copying, facsimile, and scanning, etc. Any number of devices, including printing devices, scanning devices, client devices, administrative console devices, server devices, and other computing devices, may be communicatively coupled via network 130.

DSM support service 111 may be implemented by one or more processes, and communicates with other applications and network devices. These communications include communications via (a) a distributed scan device protocol to communicate with a control point, e.g., control point service 142 of computing device 140; and (b) a distributed scan processing protocol to communicate with a scan server, e.g., scan server 122 of server device 120. In an embodiment, one or more of the protocols implemented by DSM support service 111 are performed using Web services. In an embodiment, all of the communications made by DSM device 110 via network 130 are done using Web services. In these embodiments, one or more of DSM support service 111, scan service 112, repository management service 113, quota service 114, scan server 122, Active Directory server 124, control point service 142, rule editor service 144, and repository server 152 implement one or more Web services protocols, described in more detail below.

Scan service 112 is implemented by one or more processes for acquiring document data via a scanning device at DSM device 110 or made available to DSM device 110, e.g., via network 130. Repository management service 113 is implemented by one or more processes configured to manage and/or provide access to repository information including user-specific quota data, as described in further detail below. Quota service 114 is implemented by one or more processes configured to verify scan operations against applicable quotas, and is also described in further detail below. The services attributed to DSM device 110 in example network arrangement 100 are illustrative and the functions attributed to these services herein may be performed by any logical module at DSM device 110.

DSM support service 111, scan service 112, repository management service 113, and quota service 114 may be implemented as resident processes on DSM device 110, e.g., as Java servlets. Alternatively, one or more of DSM support service 111, scan service 112, repository management service 113, and quota service 114 may be made available to DSM device 110 on removable media or may be implemented at a remote location with respect to DSM device 110. Also, DSM support service 111, scan service 112, repository management service 113, and quota service 114 may be implemented as plug-ins, or in hardware, software, or any combination of hardware or software, depending upon a particular implementation.

DSM device 110 is further configured with graphical user interface 115. Graphical user interface 115 may be displayed at a display device associated with DSM device 110. A display device may be a monitor, a screen on DSM device 110, etc. Graphical user interface 115 may be implemented in a browser, as a stand-alone application, etc., and may be managed by any service at DSM device 110.

Network 130 may be implemented with any type of medium and/or mechanism that facilitates the exchange of information between two or more of DSM device 110, server device 120, computing device 140, and computing device 150. Furthermore, network 130 may use any type of communications protocol, and may be secured or unsecured, depending upon the requirements of a particular embodiment.

Server device 120 may be implemented by any type of device that is capable of communicating with DSM device 110 and/or computing device 140 over network 130. In example network arrangement 100, server device 120 is configured with scan server 122 and Active Directory server 124, described in further detail below. Server device 120 may be configured with other mechanisms, processes and functionality, depending upon a particular implementation. In embodiments, scan server 122 and Active Directory server 124 are implemented as resident processes on Server device 120. In other embodiments, one or more of scan server 122 and Active Directory server 124 are made available to server device 120 on removable media or may be implemented at a remote location with respect to server device 120. Also, scan server 122 and Active Directory server 124 may be implemented as plug-ins, or in hardware, software, or any combination of hardware or software, depending upon a particular implementation. Furthermore, one or more of scan server 122 and Active Directory server 124 may be implemented on a computing device other than server device 120, which computing device is communicatively coupled to network 130.

Computing devices 140 and 150 may be implemented by any type of computing device that is capable of communicating with DSM device 110 and/or server device 120 over network 130. In example network arrangement 100, computing device 140 is configured with a control point service 142. Computing device 140 is further configured with a rule editor service 144 that receives information for administrator-set rules, as described in further detail below. Computing device 140 is further configured with graphical user interface 146. Graphical user interface 146 may be displayed at a display device associated with computing device 140. A display device may be a monitor, a screen on computing device 140, etc. Graphical user interface 146 may be implemented in a browser, as a stand-alone application, etc., and may be managed by any service at computing device 140.

Also in example network arrangement 100, computing device 150 is configured with a repository server 152 that communicates with one or more services of DSM device 110 and that manages repository 154, which also resides on computing device 150. Repository server 152 is described in further detail below. Repository 154 may store user-specific quota data, e.g., as a relational database, as an Extensible Markup Language (XML) database, or any other entity that may store user-specific quota data as described in further detail below. Computing devices 140 and 150 may be configured with other mechanisms, processes and functionalities, depending upon a particular implementation.

DSM Communications

DSM device 110 is considered to be a DSM-type device because DSM device 110, via DSM support service 111, communicates with control point service 142 using a distributed scan device protocol and with scan server 122 using a distributed scan processing protocol. In an embodiment, DSM support service 111 communicates with Active Directory server 124 via Lightweight Directory Access Protocol (LDAP).

Control point service 142 allows administrators to define PSPs and associate defined PSPs with one or more users or user groups. Control point service 142 causes information for the PSPs to be made accessible to Active Directory server 124. For example, control point service 142 stores PSP information at memory for server device 120 that is accessible by Active Directory server 124. In an embodiment, control point service 142 communicates with Active Directory server 124 via LDAP.

Web Services

The World Wide Web Consortium (W3C), which is an international consortium that develops standards for the World Wide Web, defines a "Web service" as a software system that is designed to support interoperable machine-to-machine interaction over a network. This definition encompasses many different systems, but in common usage, the term refers to those services that use Simple Object Access Protocol (SOAP)-formatted XML envelopes and that have interfaces described using Web Services Description Language (WSDL). Web services allow devices and applications to communicate with each other over one or more networks without the intervention of any human being, while using the same suite of protocols (e.g., Hypertext Transfer Protocol (HTTP)) that a human being would use to communicate with such devices and applications over the one or more networks.

SOAP is an XML-based, extensible message envelope format, with bindings to underlying protocols (e.g., HTTP and Simple Mail Transfer Protocol (SMTP)). Using XML, SOAP defines how messages should be formatted, so that those messages are formatted in such a way that the recipients of those messages (devices and applications) can understand the messages. SOAP can be used to perform remote procedure calls, for example.

WSDL is an XML format that allows Web service interfaces to be described along with the details of those interfaces' bindings to specific protocols. WSDL is typically used to generate server and client code, and for configuration.

Thus, common core protocols of Web services are SOAP, and WSDL, as well as WS-Discovery, WS-MetadataExchange, WS-Eventing, and WS-Addressing.

Quotas

The DSM system represented in network arrangement 100 prevents overtaxing of DSM system destinations by allowing administrators to place quotas (or limits) on the amount of data a user may transmit to the destinations. The DSM system prevents the user from sending, to a destination, more data than is indicated in the user's quota for the destination. Thus, implementation of quotas in the DSM system represented in network arrangement 100 allows administrators to more effectively manage storage resources and to prevent misuse of the resources.

Storage of Quota Rules and Quota Data

An administrator may define a rule that sets a quota for how much data a particular user or group of users may transmit to a particular destination. Additionally, administrators may define rules that govern behavior pertaining to quota verification (e.g., a time period over which a quota is applied) and actions to be taken in the case of a verification success or a verification failure.

Based on these rules, the DSM system represented in network arrangement 100 develops user-specific quota data, which is used to implement the rules. User-specific quota data includes one or more of: current quota amounts for one or more destinations; an amount of data that quota service 114 has tracked for each of the one or more destinations (which is the amount of data that the user has sent to a particular destination during any applicable time period); timestamps associated with tracking applicable time periods for quotas; the length of any applicable quota time period for each destination, etc. User-specific quota data may be retrieved from a repository, e.g., via repository management service 113, based on information uniquely identifying the user (among all users stored at the repository) and information uniquely identifying a destination (among all destinations associated with the user).

In one embodiment, DSM device 110 hosts the repository (not shown in FIG. 1). Such a repository stores user-specific quota data that is generated at DSM device 110. In this embodiment, the DSM system represented in network arrangement 100 does not track amounts of data sent to destinations from other sources (e.g., DSM devices other than DSM device 110). Also in this embodiment, administrator-defined rules are included in PSPs. Repository management service 113 manages and updates the repository and communicates needed information from the repository to quota service 114. Communication between the services of DSM device 110 may be implemented by any communication mechanism, according to embodiments, including using one or more Application Programming Interfaces (APIs) implemented by one or more of the services.

In another embodiment, computing device 150 hosts the repository (i.e., repository 154). Repository server 152 manages repository 154 and communicates with services of DSM device 110. Repository 154 may include user-specific quota data that is generated based on transactions that take place on multiple DSM devices, including DSM device 110. In this embodiment, repository 154 may store administrator-defined rules as well as user-specific quota data. When repository 154 stores administrator-defined rules, repository server 152 may perform one or more functions attributed to repository management service 113 herein. Alternatively, administrator-defined rules may be included in PSPs and repository 154 may store only user-specific quota data, depending upon a particular implementation. Repository management service 113 communicates with repository server 152, e.g., using Web services.

References made to repository 154 herein do not limit embodiments to repositories stored at a particular device.

Static Quotas

In one embodiment, an administrator-set rule for a quota creates a static quota value representing an amount of data that a user may send to a particular destination. To illustrate static quota values, an administrator assigns, to a particular user, a quota of ten (10) megabytes for a first destination that applies weekly, a quota of five (5) megabytes for a second destination that applies monthly, and a quota of one (1) gigabyte for a third destination that has no time period applied thereto. Measurement of data size, including the size of a quota, the size of document data, and the size of a destination limit, may be in any number of ways within the embodiments of the invention. In the examples set forth herein, which are non-limiting, data size is measured in bytes. However data size may also be measured in a number of pages represented by the data, in a number of files represented in the data, etc.

Quota service 114 separately tracks the amount of data that the user sends to the first, second, and third destinations. After data has been sent to a destination, quota service 114 causes a tracked amount of data for the destination, which amount includes the amount of data that has just been sent to the destination, to be saved to the repository.

For example, quota service 114 records that the user sends one (1) megabyte of data to the first destination on a first day of a particular week and three (3) megabytes of data on a second day of the particular week. Thus, quota service 114 records that the user has sent four (4) megabytes of data during that week. Because the amount of data sent to the first destination for the particular week is less than the weekly quota for the first destination, quota service 114 honors all of these requests to send data to the first destination. At the end of the particular week, quota service 114 sets the amount of data tracked for the user in connection with the first destination to zero since the quota for the first destination applies weekly. Quota service 114 then tracks the amount of data that the user sends to the first destination for another week.

Similarly, quota service 114 tracks the amount of data that the user sends to the second destination, applying the quota each month instead of each week. Thus, in this example, the user may send up to ten (10) megabytes of data to the first destination each week and up to five (5) megabytes of data to the second destination each month.

Unlike tracking data sent to the first and second destinations, quota service 114 does not reset the amount of data tracked for the user in connection with the third destination because the third destination does not have a time period associated therewith. As such, once the user has sent the amount of data indicated in the quota for the third destination to that third destination, the user may no longer send data to the third destination under that quota. However, flexibility may be introduced into such a situation by an administrator, who may adjust the amount of data that quota service 114 has tracked for a particular destination, may adjust the quota rule, may introduce a buffer value for the particular destination (described in further detail below), etc.

Dynamically-Determined Quotas

In another embodiment, a quota is dynamically determined based on an amount of available storage at a particular destination. For example, an administrator assigns to a user, for a particular destination, a weekly quota of ten percent (10%) of the storage available at the destination. In order to determine a number amount of data for the quota ("quota value") for a particular week, repository management service 113 determines an amount of available storage at the particular destination. For example, repository management service 113 may query a destination server at the particular destination for an amount of available storage. Such a query may be communicated to the destination server using Web services. In response to such a query, the destination server sends, to repository management service 113, an amount of storage at the particular destination that is free (e.g., 200 megabytes).

Repository management service 113 then determines a quota value for the user's quota for the particular destination based on the response from the destination server. According to the example above, repository management service 113 determines that the user's quota value for the particular destination is twenty (20) megabytes, which is ten percent (10%) of the amount of storage that the destination server for the particular destination indicated to be free (200 megabytes). As with all user-specific quota data, repository management service 113 stores this quota value in the repository in connection with information identifying the user and information identifying the particular destination.

Quota service 114 tracks the amount of data that the user sends to the particular destination for the particular week, preventing the user from sending more than twenty (20) megabytes of data to the particular destination. When the particular week time period is expired, quota service 114 sets the amount of data tracked for the user in connection with the particular destination to zero since the quota for the particular destination applies weekly. Repository management service 113 also recalculates, for the subsequent week, a quota value for the user's quota for the particular destination based on an amount of storage at the destination that is free and the percentage assigned as the user's quota for the destination, as described above. If a user's quota for a destination is not associated with a time period, then repository management service 113 may calculate a quota value for the quota (a) every time the user attempts to send data to the destination, or (b) at a time interval set by an administrator-set rule (e.g., daily, weekly, monthly, etc.).

Repository management service 113 may send a notification to one or more user destinations to communicate the quota value for a dynamic quota, e.g., to the user, to the user's manager, to IT personnel, etc. A user destination is contact information for a user, examples of which include an email address, telephone number, fax number, etc.

Applying a Quota to Prevent Storage Overload

Figure 2:
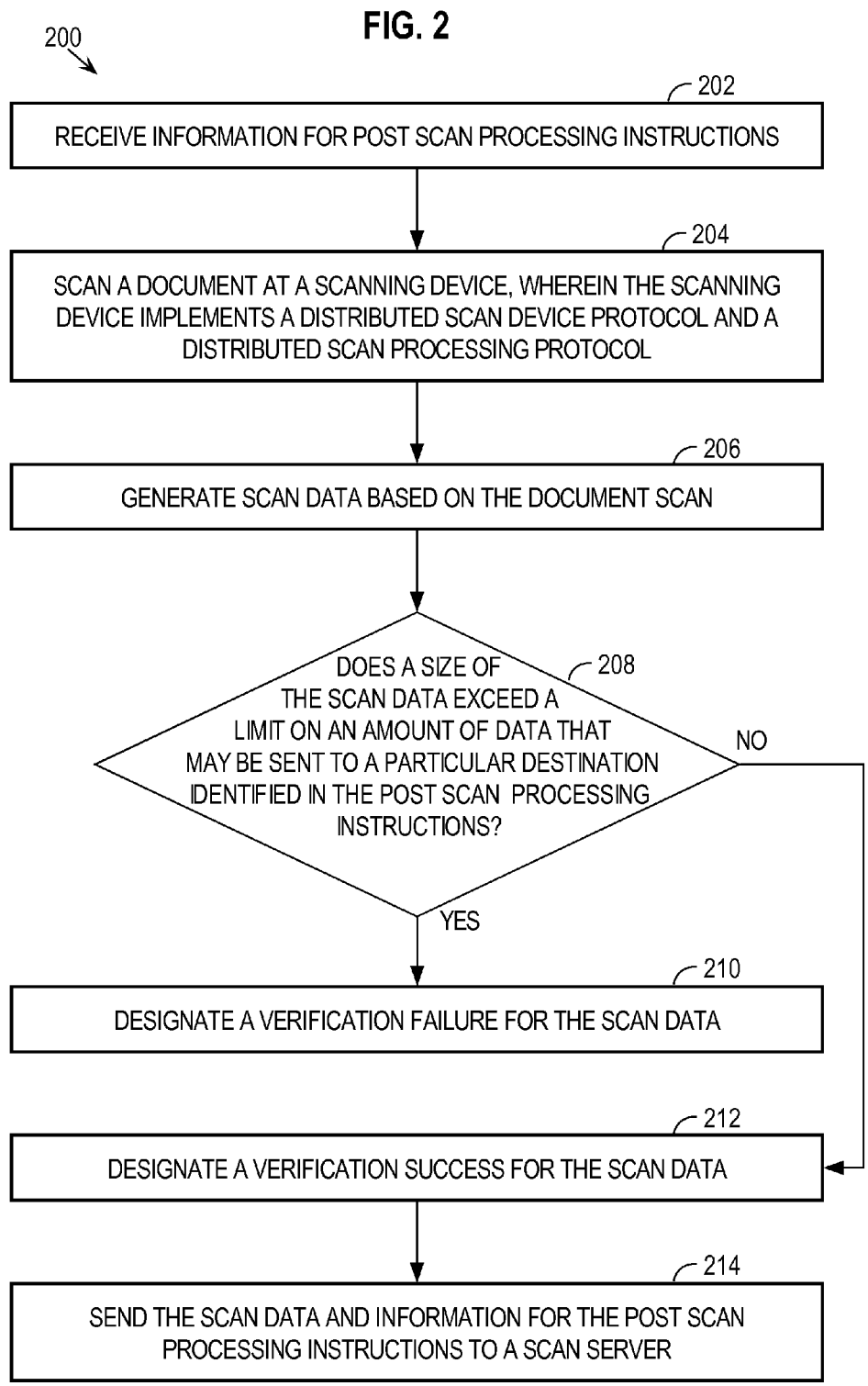
FIG. 2 illustrates a flowchart for processing scan data based, at least in part, on a quota.

FIG. 2 illustrates a flowchart 200 for processing scan data based, at least in part, on a quota, according to embodiments. The ordering of the steps in FIG. 2 is illustrative, and such ordering does not limit the embodiments of the invention. At step 202, information for post scan processing instructions is received. For example, a user inputs user authentication information (e.g., a username and password) into graphical user interface 115 at DSM device 110. DSM support service 111 authenticates the user information with Active Directory server 124. Once the user is authenticated, DSM support service 111 retrieves a list of PSPs, which are available to the user, from Active Directory server 124 and displays the list at graphical user interface 115. Through graphical user interface 115, DSM support service 111 receives the user's selection of a PSP from the list of PSPs, and the selected PSP is designated to be the processing instructions for document data that the user causes DSM device 110 to acquire.

To illustrate, the user selects a PSP that includes instructions to send scan data to first and second destinations for storage, and that includes pre-defined scan settings that will cause scan service 112 to capture the content of the scan data as a black and white Portable Document Format (PDF) file.

At step 204, a document is scanned at a scanning device, wherein the scanning device implements a distributed scan device protocol and a distributed scan processing protocol.

Continuing with the previous example, the authenticated user requests DSM device 110 to scan a document provided to DSM device 110 by the user. In response to this request, DSM device 110 scans, at a scanning device associated with DSM device 110, the document using the pre-defined scan settings in the selected PSP.

Embodiments of the invention are not limited to processing document data that is acquired via scanning. For example, DSM device 110 may acquire document data through electronic transfer of the data from a storage or computing device, through fax, or in any other manner. Thus, references herein to scan data do not limit the embodiments of the invention to acquiring data via scanning, but are used for ease of explanation. In an embodiment, if the selected PSP includes other data acquisition settings that are applicable to the manner of data acquisition used to acquire document data at DSM device 110, such settings are applied to the data acquisition.

At step 206, scan data is generated based on the document scan. For example, scan service 112 generates scan data based on the document scan performed at DSM device 110. Such scan data may include one or more of: an image of the acquired document, a reference to a storage location for an image of the acquired document, and other information for the acquired document. According to the previous example, scan service 112 stores an image of the acquired document as a black and white PDF file.

Destination Limits

At step 208, it is determined whether a size of the scan data exceeds a limit on an amount of data that may be sent to a particular destination identified in the post scan processing instructions. A limit on an amount of data that may be sent to a destination ("destination limit") is the amount of data that the authenticated user may send to the destination based on the tracked amount of data that the user has sent to the destination and the user's quota for the destination. Such determination is made for each destination in the selected PSP (e.g., for both the first and second destinations listed in the selected PSP of the above example).

To illustrate step 208 for the first destination included in the selected PSP, DSM support service 111 sends user information, information from the selected PSP, and information about the scan data to quota service 114. Quota service 114 uses the information received from DSM support service 111 to retrieve, from repository management service 113, information needed to determine the destination limit for the first destination, including a tracked amount of data for the first destination (e.g., four (4) megabytes), and the first destination's quota value (e.g., ten (10) megabytes). Quota service 114 subtracts the tracked amount of data that the user has sent to the first destination from the ten (10) megabyte quota value for the first destination to determine that the first destination's limit for the user is six (6) megabytes.

Verification Success

In this example, quota service 114 determines that a size of the scan data is six (6) megabytes, which does not exceed the first destination's limit, also six (6) megabytes. Because the size of the scan data does not exceed the first destination's limit, control passes to step 212 (FIG. 2). At step 212, a verification success is designated for the scan data. For example, quota service 114 designates a verification success for the scan data for the first destination and communicates the verification success to DSM support service 111.

At step 214, the scan data and information for the post scan processing instructions are sent to a scan server. In one embodiment, verification successes must be designated for the scan data for each destination listed in the selected PSP (e.g., for both the first and second destinations in the selected PSP of the above example) in order for control to pass to step 214. In other embodiments, described in further detail in connection with step 210, control may pass to step 214 if a verification success is designated for the scan data for at least one destination in the selected PSP. To illustrate step 214, an example is posited where verification successes are designated for the scan data for all destinations in the selected PSP. According to this example, a component of DSM device 110, e.g., DSM support service 111, scan service 112, etc., sends the scan data with the selected PSP to scan server 122. Scan server 122 processes the scan data according to the selected PSP, including sending the scan data to the destinations indicated in the selected PSP.

Verification Failure

Step 208 may also be applied to the second destination listed in the selected PSP. Quota service 114 determines that the second destination's limit for the user is two (2) megabytes based on a tracked amount of data that the user has sent to the second destination during any applicable time period and a quota value for the second destination. Since the size of the scan data is six (6) megabytes, quota service 114 determines that the size of the scan data exceeds the second destination's limit.

Because the size of the scan data exceeds the limit for the second destination, control is passed to step 210. At step 210, a verification failure is designated for the scan data. For example, quota service 114 designates a verification failure for the scan data with respect to the second destination and communicates the verification failure to DSM support service 111.

A verification failure may also be designated, for the scan data, for the first destination in connection with a second limit determined for the first destination. To illustrate, an example is posited where the user scans the same document as in the above example a second time to produce the same scan data (using the same selected PSP with the first and second destinations). In this example, quota service 114 has recorded that the user has sent ten (10) megabytes to the first destination. To make the determination of step 208, quota service subtracts the tracked amount of data that the user has sent to the first destination from the ten (10) megabyte quota value for the first destination to determine that the first destination's limit for the user at this point is zero (0) megabytes. This limit for the first destination is different from the first destination's limit in the above example because the amount of data that quota service 114 has tracked for the user for the first destination is updated. Thus, quota service 114 determines that the size of the scan data, six (6) megabytes, exceeds the first destination's limit and, at step 210, designates a verification failure for the scan data for the first destination.

Actions to be taken in the event of a verification failure for a particular destination (or "failed destination") may be set by an administrator. For example, an administrator may cause, in response to receiving communication of the verification failure, that DSM support service 111 fails the scan operation entirely, or that DSM support service 111 modifies the scan operation to allow the scan operation to proceed without sending data to the failed destination.

Failing the Scan Operation

In an embodiment, DSM support service 111 fails the scan operation entirely. When a scan operation fails entirely, the scan data is not sent to scan server 122. For example, an administrator may require that the scan operation fail entirely if a verification failure is designated for the scan data for one or more of the destinations listed in the selected PSP, or when a user instructs DSM support service 111 to abort the scan operation (described in further detail below). Also, DSM support service 111 fails a scan operation entirely when a verification failure is designated for the scan data for all destinations indicated in the selected PSP.

When a scan operation fails entirely, DSM support service 111 may cause an error message to be displayed at graphical user interface 115 that indicates that the user has exceeded a quota and that the scan operation has failed entirely. The error message may further include information about the failed quota, the particular destination associated with the failed quota, and/or any other pertinent information.

Furthermore, DSM support service may send a notification of the scan operation failure to one or more user destinations. For example, the selected PSP or repository contains a list of user destinations to which DSM support service 111 should send a notification upon a verification failure. An administrator may include, in this list of user destinations, a user destination for the user, for the user's manager, for IT personnel, etc. The notification may be an email, telephone call, fax, instant message, text, or any other means of communication. Such a notification may include one or more of information identifying a failed destination, the amount of data tracked for the failed destination, the size of the scan data that caused the failure, an image of the scanned document, help contact information, etc.

Creating a Temporary Modified PSP for the Scan Operation

In another embodiment, DSM support service 111 modifies the scan operation to allow the scan operation to proceed without sending data to the failed destination. A scan operation is modified by creating a temporary modified PSP that includes destinations in the selected PSP for which verification successes have been designated for the scan data and excludes destinations in the selected PSP for which verification failures have been designated for the scan data. The modified PSP may include all other information that was in the selected PSP, including scan attributes, user destinations, etc. Because the modified PSP is temporary, it is not stored at Active Directory server 124.

An administrator-set rule may mandate automatic modification of a scan operation under certain circumstances, including upon determining that one or more destinations of a selected PSP failed, upon receiving a user instruction to modify the scan operation (e.g., via graphical user interface 115), etc. DSM support service 111 automatically modifies a scan operation by creating a temporary modified PSP that includes all destinations from the selected PSP for which quota service 114 designated verification successes for the scan data and excludes all destinations from the selected PSP for which quota service 114 designated verification failures for the scan data.

In one embodiment, DSM support service 111 automatically modifies the scan operation based, at least in part, on information received from quota service 114 indicating that the selected PSP includes at least one failed destination, and at least one destination that did not fail. For example, the selected PSP includes a first and a second destination, and quota service 114 sends information to DSM support service 111 that a verification success was determined for the first destination and a verification failure was determined for the second destination. Based on this information, DSM support service creates a temporary modified PSP that includes the first destination and excludes the second destination. In all other ways, the temporary modified PSP is the same as the selected PSP.

Figure 3:
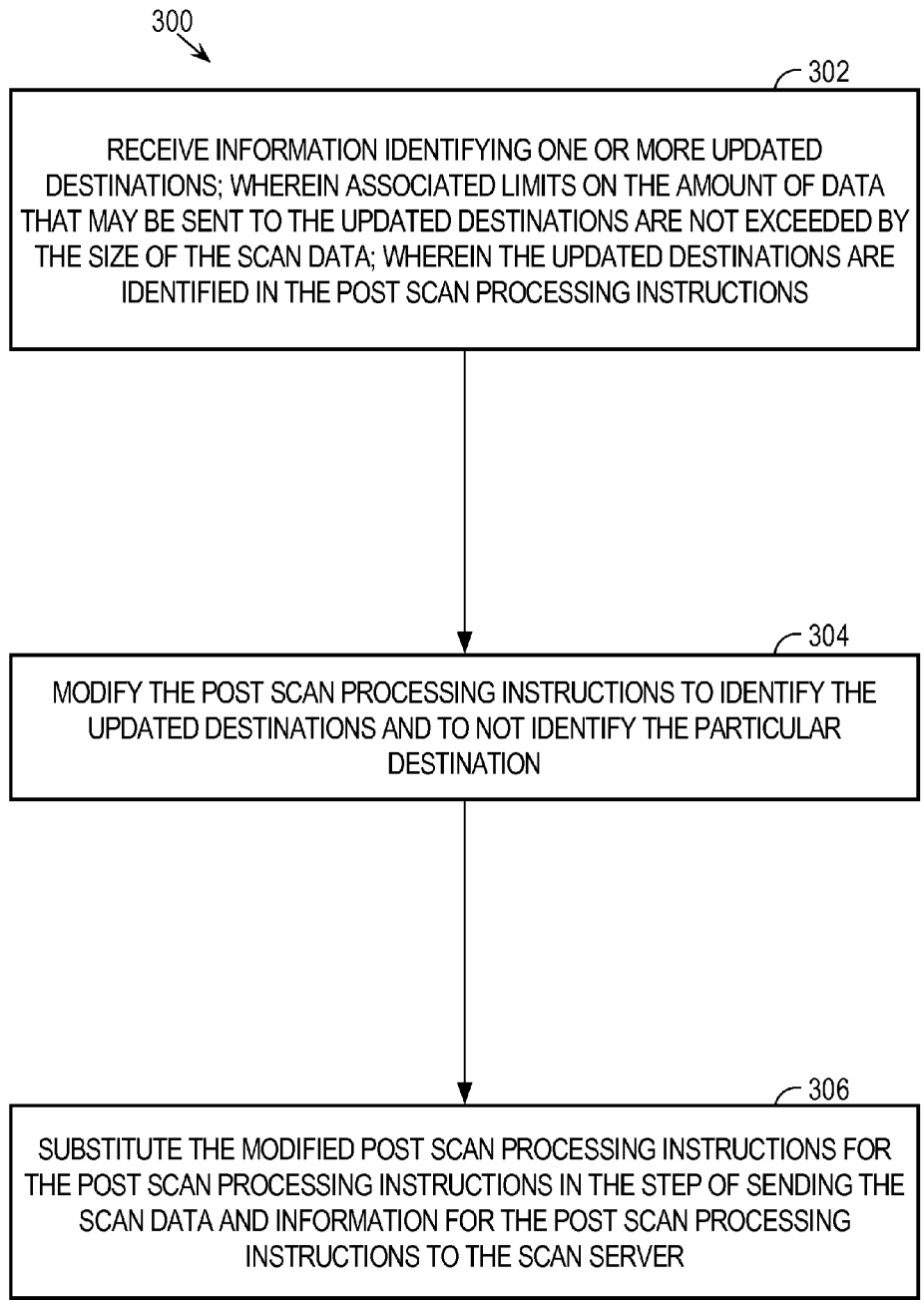
FIG. 3 illustrates a flowchart creating a temporary modified PSP based, at least in part, on instructions from a user.

In another embodiment, DSM support service 111 bases modification of the selected PSP, in part, on a selection of destinations received from the user. FIG. 3 illustrates a flowchart 300 for creating a temporary modified PSP based, at least in part, on instructions from a user, according to embodiments. At step 302, information identifying one or more updated destinations is received; wherein associated limits on the amount of data that may be sent to the updated destinations are not exceeded by the size of the scan data; wherein the updated destinations are identified in the post scan processing instructions.

For example, DSM support service 111 presents to the user, via graphical user interface 115, an option of whether to proceed with the scan operation (at which point the user may instruct DSM support service 111 to abort the scan operation) and a list of destinations that may be included in the temporary modified PSP if the scan operation is not to be aborted. The list of destinations displayed at graphical user interface 115 includes only destinations from the selected PSP for which quota service 114 has designated verification successes for the scan data. The user may select one or more of the displayed destinations to be included in the temporary modified PSP. DSM support service 111 receives information indicating the user's selection of one or more of the displayed destinations via graphical user interface 115. In an embodiment, DSM support service 111 causes the scan operation to fail if no response is received from the user after a time-out period indicated in an administrator-set rule.

At step 304, the post scan processing instructions are modified to identify the updated destinations and to not identify the particular destination. For example, DSM support service 111 creates a temporary modified PSP that includes only those destinations indicated in the user's selection. In all other ways, the temporary modified PSP is the same as the selected PSP.

Using a Temporary Modified PSP

At step 306, the modified post scan processing instructions are substituted for the post scan processing instructions in the step of sending the scan data and information for the post scan processing instructions to the scan server. For example, DSM support service 111 sends the scan data with the temporary modified PSP, and not the selected PSP, to scan server 122. Scan server 122 processes the scan data according to the modified PSP, including sending the scan data to destinations indicated in the modified PSP for which verification successes were designated.

An administrator may cause that a notification be sent to a list of user destinations when a modified PSP is used to perform a scan operation. Such a notification may be sent in a manner similar to the notification sent in connection with the failure of a scan operation, and may include similar information as well.

Buffer Values

A destination limit may also be based, in part, on a buffer value for the destination. For example, a destination is associated with a quota value of twenty (20) megabytes and a buffer value of ten (10) megabytes for a particular user. The destination is also associated with a list of buffer user destinations. A verification failure is not designated for the scan data for the destination until the user sends more than the buffer value in addition to the quota value, or thirty (30) megabytes, to the destination within any applicable time period. If the user initiates a scan operation that sends over twenty (20) megabytes, but under thirty (30) megabytes of data (cumulatively) to the destination within any applicable time period, quota service 114 designates a verification success for the scan operation.

When a user thus uses part of a buffer value for a destination, DSM support service 111 sends a notification to the list of buffer user destinations indicating that the quota has been exceeded, but that the buffer value has not yet been exceeded for the particular user for the destination. Such a notification may be sent in a manner similar to the notification sent in connection with the failure of a scan operation, and may include similar information as well. If the user sends over thirty (30) megabytes of data to the destination within any applicable time period, quota service 114 designates a verification failure for the scan data for the destination.

Updating the Repository

In an embodiment where the repository resides at DSM device 110, repository management service 113 updates the user-specific quota information in the repository based on information in the selected PSP. Specifically, after the user selects the PSP (e.g., at step 202 of FIG. 2), DSM support service 111 sends user information and information from the selected PSP to repository management service 113 with an instruction to update the repository. Repository management service 113 determines whether user-specific quota data for the user identified in the user information exists in the repository. If not, repository management service 113 establishes information for the user in the repository. User information includes one or more of a user identifier, any information that is applicable to all destinations for the user, destination information, a PSP identifier associated with the user, etc.

For each destination listed in the selected PSP information, repository management service 113 establishes information for the destination in connection with the user information in the repository if such destination does not already exist. Destination information in the repository includes a destination identifier, and a quota, which may be set to 'unlimited'. Destination information may also include one or more of a tracked amount of data for the quota (initially set to zero (0)), a date identifying when the quota was set, an additional number value for the quota (if the quota is dynamic), a time period, a time stamp to indicate the beginning of an applicable time period, a buffer value, a list of buffer user destinations, a PSP identifier associated with the destination, and any other pertinent information.

If the destination information for a particular destination included in the PSP information already exists for the user in the repository, repository management service 113 updates the destination information based on the information in the PSP. If the quota for the particular destination in the PSP information is different than the quota for the particular destination stored at the repository, then repository management service 113 may (a) replace the quota in the repository with the quota in the PSP information if the quota in the PSP information is more recently updated than the quota in the repository (i.e., based on timestamps identifying when the quotas were set); (b) always replace the quota stored at the repository with the quota in the PSP information; (c) replace the quota in the repository with the quota in the PSP information if the quota in the PSP information is larger than the quota in the repository; etc.

Once repository management service 113 completes the update of the repository, repository management service 113 communicates to DSM support service 111 that the update was successfully completed. Upon receiving this communication DSM support service 111 requests that quota service 114 verify the quotas in the selected PSP, at which point quota service 114 requests the information necessary for verifying the quotas of the destinations in the selected PSP from repository management service 113. Thus, quota service 114 receives any updates performed by repository management service 113.

In an embodiment, the repository resides at computing device 150, i.e., repository 154, and administrator-set rules for quotas are stored in a user's PSP. According to this embodiment, repository management service 113 updates repository 154 by sending the user information and PSP information received from DSM support service 111 to repository server 152, e.g., using Web services, with a request for repository server 152 to update repository 154 based on the user information and PSP information as described above. Repository server 152 communicates to repository management service 113 when the update is completed. In turn, repository management service 113 informs DSM support service 111 that the update is completed, which allows DSM support service 111 to continue.

In an embodiment where the repository resides at computing device 150, i.e., repository 154, and administrator-set rules for quotas are also stored at repository 154, repository server 152 updates repository 154 any time the administrator-set rules are updated in repository 154. As such, DSM support service 111 does not send user information and PSP information to repository management service 113 prior to requesting that quota service 114 verify the quotas in the selected PSP because repository 154 is assumed to be up-to-date.

Rule Editor

According to an embodiment, administrators may adjust administrator-set rules stored in PSPs via a user interface provided by control point service 142, which is used to create and edit PSPs, depending upon a particular implementation. For example, the user interface provided by control point service 142 may be updated to allow an administrator to enter, into a PSP, quota information including a quota value, a time period, and flags to support other administrator-set rules, etc.

In another embodiment, rule editor service 144 of computing device 140 is configured to receive information about administrator-set rules, e.g., via graphical user interface 146. Rule editor service 144 may also populate graphical user interface 146 with (a) user-specific quota data for a particular user or group of users and/or (b) administrator-set rules that were previously set by an administrator for a particular user or group of users, etc. Rule editor service 144 may receive information about any administrator-set rule and store the information in the PSPs for the appropriate users, or in repository 154, depending upon a particular implementation. An administrator may update information for a particular user or for a group of users through rule editor service 144, and rule editor service 144 automatically causes the information to be updated in all appropriate locations in PSPs and/or the repository.

For example, an administrator may adjust a quota value for a particular destination for a group of users, where users that belong to the group are known to rule editor service 144. If quota values are stored at the users' PSPs, then rule editor service 144 updates, with the new quota value, the quota associated with the particular destination, in all PSPs that include the particular destination, for all users in the group.

Rule editor service 144 may also allow an administrator to adjust tracked information in user-specific quota data for a particular user or for a group of users. For example, rule editor service 144 may allow an administrator to change the amount of data tracked for a particular destination for a particular user, or to change the timestamp that marks the start of a time period for a user's quota for a particular destination, etc.

Furthermore, rule editor service 144 may allow an administrator to indicate what DSM support service 111 should do in the event of a verification failure or verification success. For example, rule editor service 144 may allow an administrator to set a rule causing DSM support service 111 to automatically abort a scan operation associated with a verification failure for all users that may send data to a particular destination, or for a particular user, or for a group of users, etc.

Alternatives and Extensions

The format of post scan processing instructions that is current defined by Microsoft and stored at an Active Directory such as Active Directory server 124 (FIG. 1) may be modified to add a new field to communicate a storage quota for each destination in the instructions.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
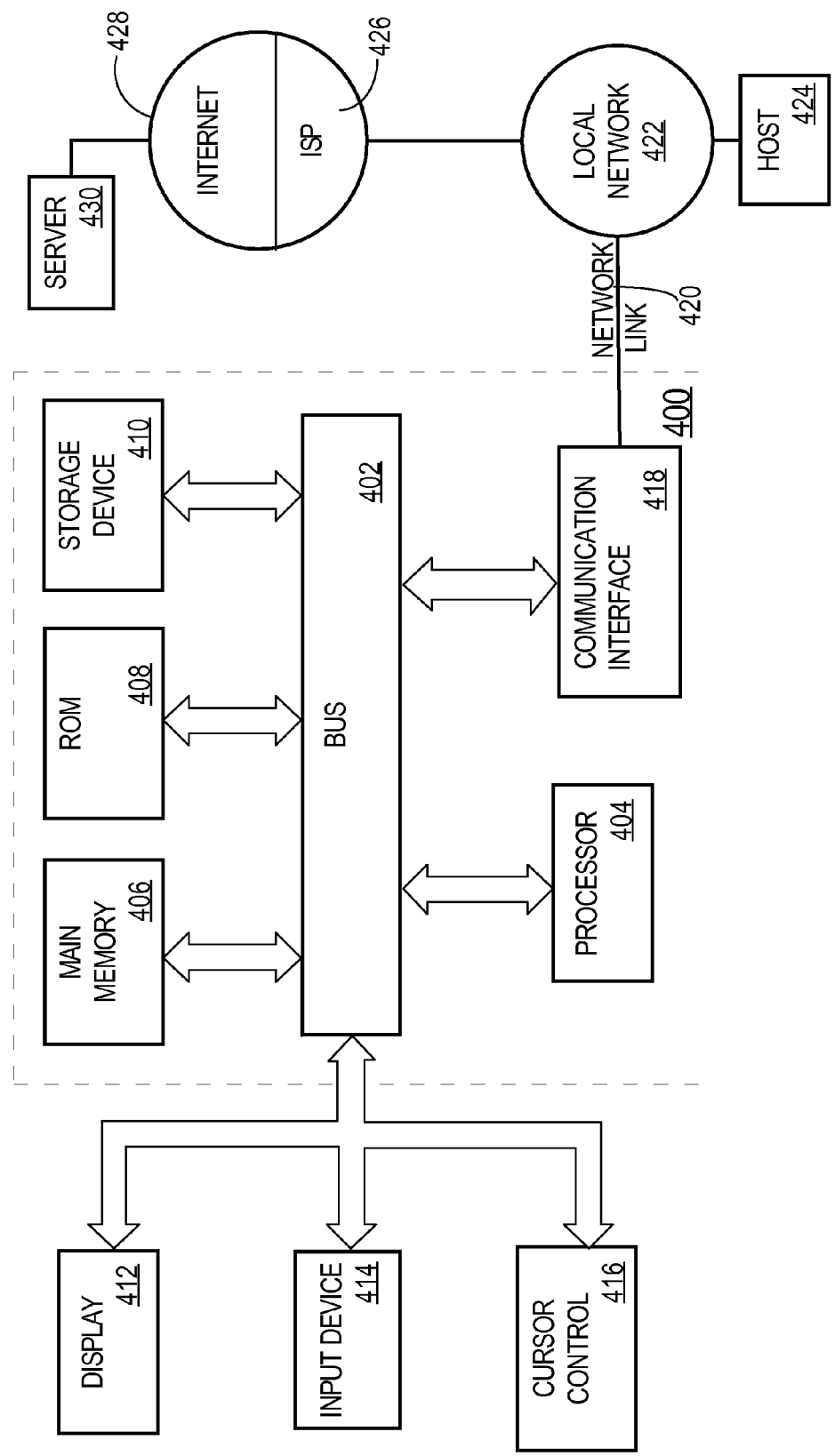
FIG. 4 is a block diagram of a computer system on which embodiments of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A scanning device comprising:
   a scan service configured to:
      scan a document, and
      generate scan data based on the document scan;
   a distributed scan management service that implements a distributed scan device protocol and a distributed scan processing protocol;
   wherein the distributed scan management service is configured to:
      receive information for post scan processing instructions, and
      responsive, at least in part, to a quota handler service, implemented on the scanning device, designating a verification success for the scan data, send the scan data and information for the post scan processing instructions to a scan server;
   the quota handler service configured to:
      determine a limit on an amount of data that may be sent to a particular destination identified in the post scan processing instructions based, at least in part, on a user-specific quota for the particular destination,
      determine whether a size of the scan data exceeds the limit on the amount of data that may be sent to the particular destination identified in the post scan processing instructions,
      responsive to determining that the size of the scan data does not exceed the limit, designate the verification success for the scan data.

2. The scanning device of claim 1, wherein the quota handler service is further configured to determine the limit on the amount of data that may be sent to the particular destination identified in the post scan processing instructions based, at least in part, on a buffer value for the particular destination.

3. The scanning device of claim 1, wherein the quota handler service is further configured to determine the limit on the amount of data that may be sent to the particular destination based, at least in part, on a percentage of available storage at the particular destination.

4. The scanning device of claim 1,
   further comprising a repository management service configured to update, in a repository, a quota value for the particular destination based, at least in part, on the post scan processing instructions;
   wherein the quota handler service is further configured to:
      retrieve the updated quota value for the particular destination from the repository, and
      determine the limit on the amount of data that may be sent to the particular destination based, at least in part, on the updated quota value.

5. The scanning device of claim 1, wherein the quota handler service is further configured to:
   determine whether the size of the scan data exceeds a second limit on an amount of data that may be sent to a certain destination identified in the post scan processing instructions; and
   responsive to determining that the size of the scan data exceeds the second limit, designate a verification failure for the scan data.

6. The scanning device of claim 5, wherein the certain destination is a second destination, other than the particular destination, identified in the post scan processing instructions.

7. The scanning device of claim 5, wherein the certain destination is the particular destination.

8. The scanning device of claim 1, wherein the distributed scan management service is further configured to:
   receive information identifying one or more updated destinations;
   wherein associated limits on the amount of data that may be sent to the one or more updated destinations are not exceeded by the size of the scan data;
   modify the post scan processing instructions to identify the one or more updated destinations and to not identify the particular destination, producing modified post scan processing instructions; and
   wherein said information for the post scan processing instructions comprises information for the modified post scan processing instructions.

9. One or more non-transitory computer-readable media storing instructions which, when processed by one or more processors, cause:
   a scan service executing on a scanning device and:
      scanning a document, and
      generating scan data based on the document scan;
   a distributed scan management service executing on the scanning device and:
      implementing a distributed scan device protocol and a distributed scan processing protocol,
      receiving information for post scan processing instructions, and
      responsive, at least in part, to a quota handler service executing on the scanning device and designating a verification success for the scan data, sending the scan data and information for the post scan processing instructions to a scan server;
   the quota handler service:
      determining a limit on an amount of data that may be sent to a particular destination identified in the post scan processing instructions based, at least in part, on a user-specific quota for the particular destination,
      determining whether a size of the scan data exceeds the limit on the amount of data that may be sent to the particular destination identified in the post scan processing instructions, and
      responsive to determining that the size of the scan data does not exceed the limit, designating the verification success for the scan data.

10. The one or more non-transitory computer-readable media of claim 9, wherein the instructions further comprise instructions which, when processed by the one or more processors, cause the quota handler service to determine the limit on the amount of data that may be sent to the particular destination identified in the post scan processing instructions based, at least in part, on a buffer value for the particular destination.

11. The one or more non-transitory computer-readable media of claim 9, wherein the instructions further comprise instructions which, when processed by the one or more processors, cause the quota handler service to determine the limit on the amount of data that may be sent to the particular destination based, at least in part, on a percentage of available storage at the particular destination.

12. The one or more non-transitory computer-readable media of claim 9, wherein:
   the instructions further comprise instructions which, when processed by the one or more processors, cause a repository management service executing on the scanning device and:
      updating, in a repository, a quota value for the particular destination based, at least in part, on the post scan processing instructions;
   the instructions further comprise instructions which, when processed by the one or more processors, cause the quota handler service to:
      retrieve the updated quota value for the particular destination from the repository, and
      determine the limit on the amount of data that may be sent to the particular destination based, at least in part, on the updated quota value.

13. The one or more non-transitory computer-readable media of claim 9, wherein the instructions further comprise instructions which, when processed by the one or more processors, cause the quota handler service to:
   determine whether the size of the scan data exceeds a second limit on an amount of data that may be sent to a certain destination identified in the post scan processing instructions; and
   responsive to determining that the size of the scan data exceeds the second limit, designate a verification failure for the scan data.

14. The one or more non-transitory computer-readable media of claim 13, wherein the certain destination is a second destination, other than the particular destination, identified in the post scan processing instructions.

15. The one or more non-transitory computer-readable media of claim 13, wherein the certain destination is the particular destination.

16. The one or more non-transitory computer-readable media of claim 9, wherein the instructions further comprise instructions which, when processed by the one or more processors, cause the distributed scan management service to:
   receive information identifying one or more updated destinations;
   wherein associated limits on the amount of data that may be sent to the one or more updated destinations are not exceeded by the size of the scan data;
   modify the post scan processing instructions to identify the one or more updated destinations and to not identify the particular destination, producing modified post scan processing instructions; and
   wherein said information for the post scan processing instructions comprises information for the modified post scan processing instructions.

17. A computer-executed method comprising:
   receiving information for post scan processing instructions;
   scanning a document at a scanning device;
   wherein the scanning device implements a distributed scan device protocol and a distributed scan processing protocol;
   generating scan data based on the document scan;
   determining a limit on an amount of data that may be sent to a particular destination identified in the post scan processing instructions based, at least in part, on a user-specific quota for the particular destination;
   determining whether a size of the scan data exceeds the limit on the amount of data that may be sent to the particular destination identified in the post scan processing instructions; and
   responsive to determining that the size of the scan data does not exceed the limit, designating a verification success for the scan data; and
   responsive, at least in part, to designating the verification success for the scan data, sending the scan data and information for the post scan processing instructions to a scan server.

18. The computer-executed method of claim 17, further comprising:
   updating, in a repository, a quota value for the particular destination based, at least in part, on the post scan processing instructions;
   retrieving the updated quota value for the particular destination from the repository; and
   determining the limit on the amount of data that may be sent to the particular destination based, at least in part, on the updated quota value.

* * * * *